3 Sheets--Sheet 1.

W. W. WYTHE.
Speed-Recorders for Railroad Trains.

No. 153,470. Patented July 28, 1874.

WITNESSES

INVENTOR

3 Sheets--Sheet 2.

W. W. WYTHE.
Speed-Recorders for Railroad Trains.

No. 153,470. Patented July 28, 1874.

3 Sheets--Sheet 3
W. W. WYTHE.
Speed-Recorders for Railroad Trains.
No. 153,470. Patented July 28, 1874.
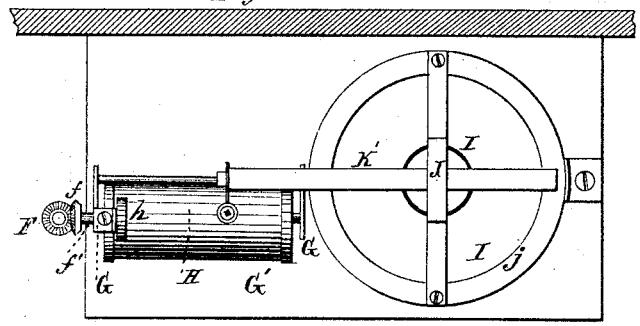
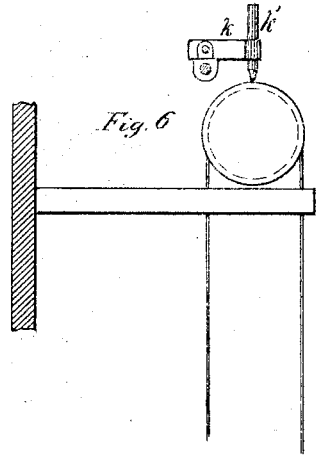
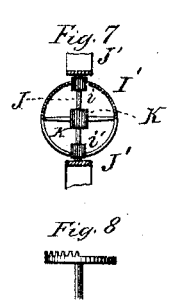
WITNESSES
INVENTOR
Wm. W. Wythe
By Wm. D. Baldwin his Attorney
THE GRAPHIC CO. PHOTO-LITH. 39 & 41 PARK PLACE, N.Y.

UNITED STATES PATENT OFFICE.

WILLIAM W. WYTHE, OF MEADVILLE, PENNSYLVANIA.

IMPROVEMENT IN SPEED-RECORDERS FOR RAILROAD-TRAINS.

Specification forming part of Letters Patent No. 153,470, dated July 28, 1874; application filed June 1, 1874.

*To all whom it may concern:*

Be it known that I, WILLIAM W. WYTHE, of Meadville, in the county of Crawford and State of Pennsylvania, have invented certain new and useful Improvements in Speed-Recorders and Time-Indicators for Railroad-Trains, of which the following is a specification:

My invention relates to that class of machines designed accurately to register the speed of locomotives or trains of cars at all times between any two points, to show the time taken to travel any distance between the ends of the route, and to indicate the stoppages and delays of trains.

The improvements claimed will hereinafter be specified.

Figure 1:
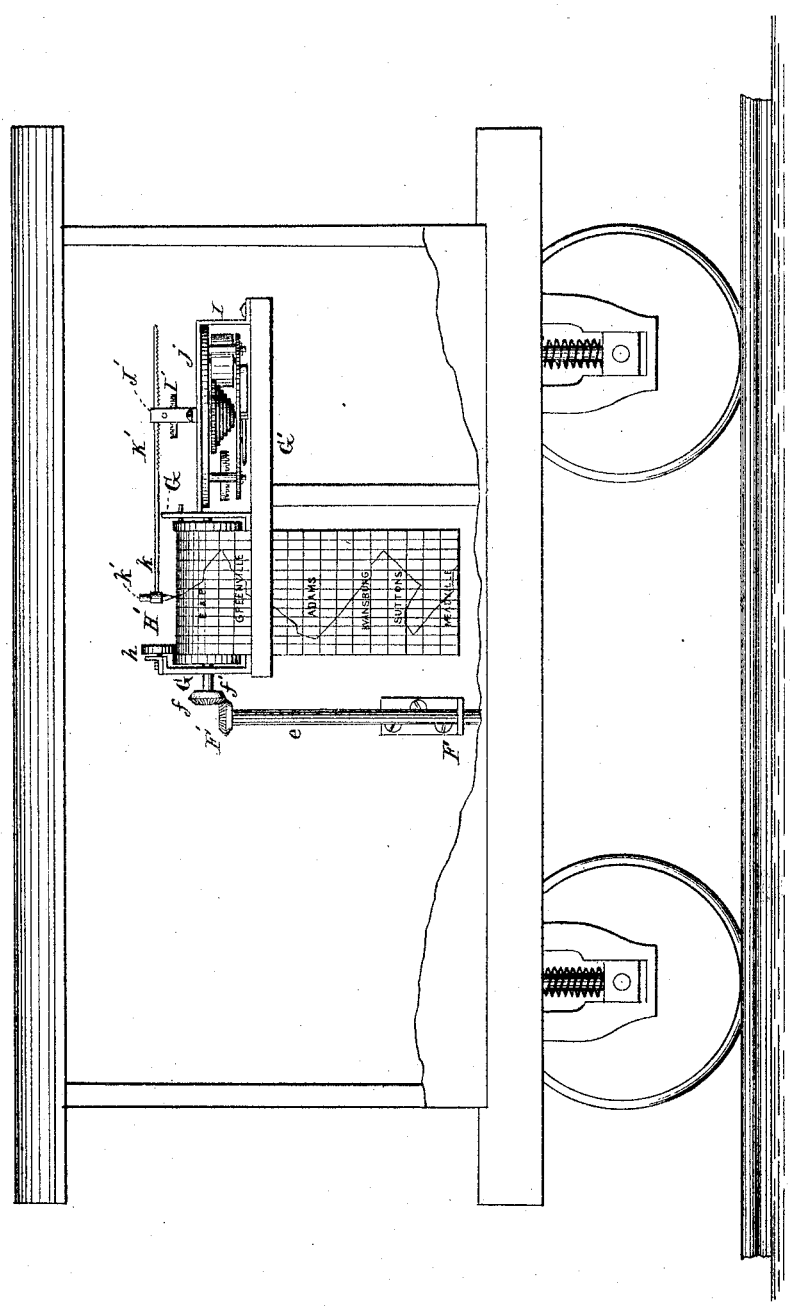
Figure 2:
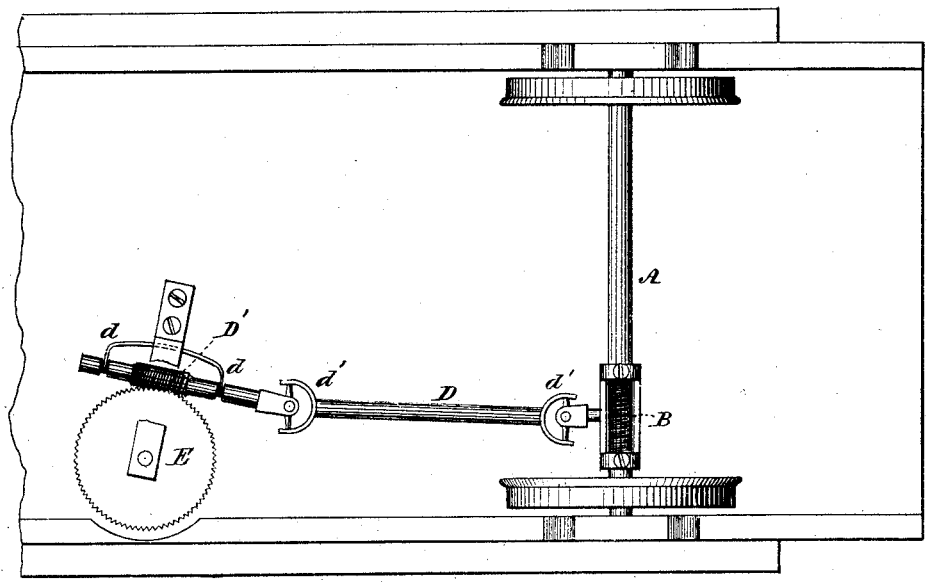
Figure 3:
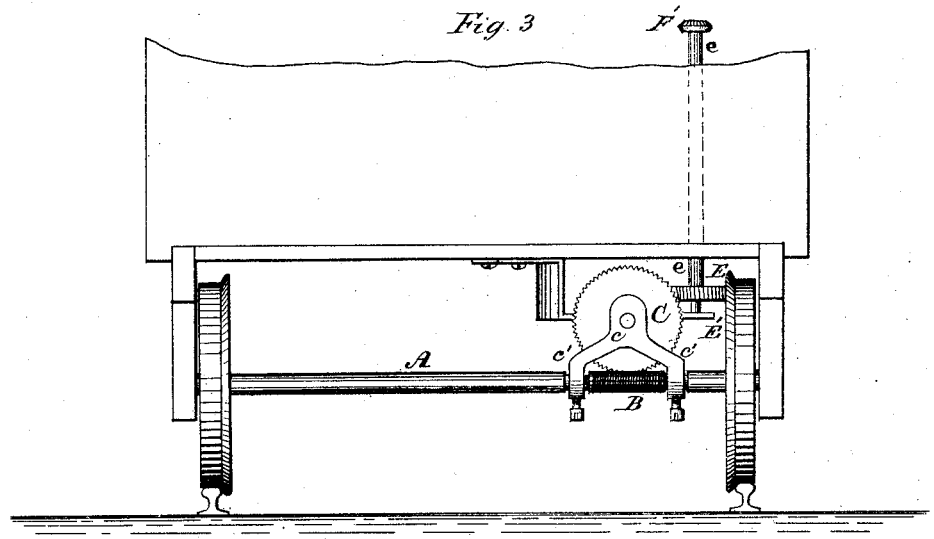

In the accompanying drawings, Figure 1 represents, in elevation, an inside view of a car with my improvements applied thereto; Fig. 2, a bottom view of a car with my improvements applied thereto; Fig. 3, an end view of the car and the parts beneath it; Fig. 4, a plan view of the mechanism inside of the car; Fig. 5, a side elevation of the pencil or marker operating devices. Figs. 6, 7, and 8 are an end view, a plan view partly in section, and an elevation, of details of the recording mechanism.

The axle A of a car has a worm, B, formed thereon or applied thereto, with which gears a worm-pinion, C, fast on one end of a shaft, D, mounted in a bracket, c, the forks or arms c' of which are secured, by set-screws, to the axle, or to a sleeve thereon, upon which the worm B may be formed, so that the bracket is prevented from sliding endwise of or parallel with the axle. The shaft D is supported, at or near its opposite end, in bearings d d beneath the car, to the bottom of the body of which the end of the shaft is thus securely attached. A worm, D', on the shaft gears with a worm-pinion, E, turning with a shaft, e, supported at its lower end in a downhanging arm or plate, E', secured to the bottom of the car. The shaft D has universal joints d' d', of any well-known construction, which insure the transmission of motion from the worm B and pinion C to the pinion E, regardless of the movement of the car upon its springs, and the consequent elevation or depression of the pinion E and worm D', the shaft flexing as the springs work up and down, and the bracket c rocking on the axle without throwing the worm B and pinion C out of gear, while leaving the pinion E and worm D' always in a fixed or unchanged position relatively to each other and to the car-body. The shaft e, upon which the pinion E is fixed, passes up through the car-floor, is provided with a bearing, F, and has fixed to its upper end a bevel-pinion, F', which gears with a corresponding pinion, f, fast on a shaft, f', mounted in the ends of a frame, G, secured upon a support, G', attached to the floor or side of the car. The shaft f' carries a roller, H, upon or over which moves a strip, H', of paper or other suitable material, ruled with longitudinal and transverse lines. (See Fig. 1.) A friction or bearing roller, h, is mounted on a stud-shaft above the roller H in the frame, to keep the paper from slipping or becoming loose on its roller. Puncturing-points may be secured in the roller H to penetrate the paper just outside of the friction-roller, if desired. The spaces vertically between the lines on the roll may represent each one or more miles, and the spaces laterally between the longitudinal lines may represent each one or more minutes. The spaces may be subdivided by lighter lines into fractions of miles and of minutes. Clock-work I, which should be inclosed in a case to exclude dust, is secured upon the support, G', at one end of the roller H. To the arbor of the minute-hand is secured a segmental crown-pinion, I', one-half of the circumference of the wheel being toothed and the other half plain, which gears alternately with pinions i i' as it revolves. These pinions are secured to a shaft, J, turning in bearings in a yoke or forked support, J', which is secured to or forms part of the frame or casing j of the clock-work. By this means, a pinion, K, on the shaft J, which revolves first one way and then the other, is caused to reciprocate a rack or toothed bar, K', with which it gears, the bar being kept in contact with the pinion K, between the pinions i i', by a guide-lug or pins on the under side of the yoke J'. The bar moves thirty minutes each way. At the end of the bar, over the graduated roll of paper, is a spring holder or clamp, k, for a pencil, k', or other marker. The bar and its pencil are caused to move in a straight line back and forth, when moved by the clock-work, by means of a guideway, L, supported in the frame G, and guides or lugs l.

I prefer to use a single roller for the paper strip, as shown, from which the strip passes, through a slot in the support G', to the floor of the car, or to a box or other suitable receptacle.

The graduated strip may have the stations marked on it, as shown in Fig. 1.

The operation is as follows: Suppose the motion communicated to the pinion $f$ to be such as to cause the strip to traverse at the proper rate of speed to have the spaces between the transverse lines each to indicate that three miles have been traveled. It will be seen, by reference to the diagonal line made by the marker, Fig. 1, that the distance between Adams and Evansburg is a fraction over nine miles, and that the time taken to make the distance was about twenty minutes, supposing the spaces crosswise of the paper each to represent three minutes. At Evansburg there is a straight or transverse line made by the marker, showing that the roll was stationary for about three minutes, and indicating that the train stopped for that length of time. By the diagonal lines from Evansburg to Sutton's, and beyond, it is seen that the train passed Sutton's, and then returned, the time lost being indicated.

I claim as my invention—

1. The combination, substantially as set forth, of the car-axle, the worm thereon, the worm-wheel rocking on the axle, the flexible shaft revolved by the worm-wheel and moving at one end therewith, and fixed bearings for the shaft secured to the car, whereby the gearing accommodates itself to the movements of the car upon its springs, as set forth.

2. The combination of the worm-wheel rocking on the car-axle and gearing with the worm thereon, the flexible shaft revolved by the rocking worm-wheel moving therewith at one end and turning in fixed bearings secured to to the bottom of the car at its opposite end, the worm on the flexible shaft, the worm-pinion revolved thereby in fixed relation thereto, the bevel-pinion shaft revolving with the fixed worm-wheel, the bevel-pinions, and the paper carrying roller, substantially as set forth.

3. The combination of clock-work, a segmental crown-wheel driven thereby, spur-pinions alternately gearing with said crown-wheel, the intermediate pinion, the rack-bar gearing with said pinion, the traversing pencil-holder, the paper-carrying roller, and the graduated strip traversing thereon, these members being constructed and operating in combination, substantially as set forth.

In testimony whereof I have hereunto subscribed my name.

WM. W. WYTHE.

Witnesses:
REUBEN C. FREY,
M. V. SHAVER.